(12) United States Patent
Mueller et al.

(10) Patent No.: US 10,024,420 B2
(45) Date of Patent: Jul. 17, 2018

(54) METHOD FOR SHIFTING A TRANSMISSION

(71) Applicant: Bayerische Motoren Werke Aktiengesellschaft, Munich (DE)

(72) Inventors: Fabian Mueller, Munich (DE); Benjamin Kluge, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 230 days.

(21) Appl. No.: 14/821,182

(22) Filed: Aug. 7, 2015

(65) Prior Publication Data
US 2015/0345623 A1 Dec. 3, 2015

Related U.S. Application Data

(63) Continuation of application No. PCT/EP2014/052705, filed on Feb. 12, 2014.

(30) Foreign Application Priority Data

Mar. 25, 2013 (DE) .................. 10 2013 205 177

(51) Int. Cl.
*F16H 61/04* (2006.01)

(52) U.S. Cl.
CPC . *F16H 61/0403* (2013.01); *F16H 2061/0474* (2013.01); *F16H 2200/0065* (2013.01);
(Continued)

(58) Field of Classification Search
CPC ..... F16H 2061/0474; F16H 2200/2064; F16H 2200/2094; F16H 61/0403
See application file for complete search history.

(56) References Cited

U.S. PATENT DOCUMENTS 8,986,156 B1 * 3/2015 Hwang ............... F16H 3/66
475/286
2004/0152563 A1 8/2004 Dreibholz et al.
(Continued)

FOREIGN PATENT DOCUMENTS

CN 1755163 A 4/2006
CN 101970903 A 2/2011
(Continued)

OTHER PUBLICATIONS

Chinese Office Action issued in counterpart Chinese Application No. 201480011063.5 dated Apr. 25, 2016 with English translation (12 pages).
(Continued)

*Primary Examiner* — Stacey Fluhart
(74) *Attorney, Agent, or Firm* — Crowell & Moring LLP

(57) ABSTRACT

A method is provided for shifting a transmission, more particularly an automatic planetary transmission, having multiple non-positive shift elements and at least one positive shift element. The transmission can assume particular transmission states according to current shifting states of the shift elements, each transmission state having a particular transmission ratio between a transmission input and a transmission output. At least two transmission states have identical transmission ratios. To shift into a first of the at least two transmission states that have identical transmission ratios, only non-positive shift elements are engaged. By contrast, to shift into a second of the at least two transmission states that have identical transmission ratios, at least one positive shift element is engaged. At least for shift operations involving shifting to the identical transmission ratio from a current transmission state that has a transmission ratio other than the identical transmission ratio, the transmission is shifted first (Continued)

into the first transmission state and then into the second transmission state.

12 Claims, 1 Drawing Sheet

(52) U.S. Cl.
CPC ............... *F16H 2200/2012* (2013.01); *F16H 2200/2046* (2013.01); *F16H 2200/2064* (2013.01); *F16H 2200/2094* (2013.01)

(56) References Cited

U.S. PATENT DOCUMENTS

| | | |
|---|---|---|
| 2010/0105517 A1 | 4/2010 | Borntraeger |
| 2011/0009229 A1 | 1/2011 | Bauknecht et al. |
| 2011/0263382 A1 | 10/2011 | Arnold et al. |
| 2012/0135838 A1 | 5/2012 | Cuppers et al. |
| 2012/0152685 A1 | 6/2012 | Phillips et al. |
| 2012/0283064 A1 | 11/2012 | Herbeth et al. |
| 2013/0196814 A1* | 8/2013 | Gumpoltsberger ....... F16H 3/66 475/284 |
| 2013/0253788 A1* | 9/2013 | Arnold ................... F16H 61/16 701/60 |
| 2015/0094185 A1* | 4/2015 | Beck ........................ F16H 3/66 475/275 |

FOREIGN PATENT DOCUMENTS

| | | |
|---|---|---|
| CN | 102472383 A | 5/2012 |
| CN | 102537119 A | 7/2012 |
| CN | 102713369 A | 10/2012 |
| DE | 103 04 050 A1 | 8/2004 |
| DE | 10 2009 000 253 A1 | 7/2010 |
| DE | 10 2009 028 305 A1 | 2/2011 |
| DE | 10 2010 042 656 A1 | 4/2012 |
| EP | 1 624 231 A2 | 2/2006 |
| EP | 2 122 196 B1 | 6/2011 |

OTHER PUBLICATIONS

International Search Report dated Apr. 25, 2014 with partial English translation (Six (6) pages).
German Search Report dated Dec. 10, 2013 (Eight (8) pages).

* cited by examiner

METHOD FOR SHIFTING A TRANSMISSION

CROSS REFERENCE TO RELATED APPLICATIONS

This application is a continuation of PCT International Application No. PCT/EP2014/052705, filed Feb. 12, 2014, which claims priority under 35 U.S.C. § 119 from German Patent Application No. 10 2013 205 177.8, filed Mar. 25, 2013, the entire disclosures of which are herein expressly incorporated by reference.

BACKGROUND AND SUMMARY OF THE INVENTION

The present invention relates to a method for performing shifts in a gearbox, in particular a planetary-type automatic gearbox, which has multiple non-positively engaging shift elements and at least one positively engaging shift element.

In conventional automatic gearboxes, the individual gear stages are shifted by actuation of frictionally engaging shift elements (for example, multiplate clutches or multiplate brakes). Those shift elements which are not actuated, that is to say are open, in the individual gears generate certain drag torques, which has an adverse effect on gearbox efficiency. It has therefore already been considered to replace individual frictionally engaging shift elements of automatic gearboxes with positively engaging shift elements, where this is technically actually possible.

It is an object of the invention to provide a method for performing shifts in a gearbox under load, which gearbox has multiple non-positively engaging shift elements and at least one positively engaging shift element.

This and other objects are achieved in accordance with embodiments of the invention.

The starting point of the invention is a gearbox, in particular a planetary-type automatic gearbox, which has multiple non-positively engaging shift elements and at least one positively engaging shift element.

The non-positively engaging shift elements may be, for example, frictional shift elements, in particular friction clutches or friction brakes such as, for example, multiplate clutches or multiplate brakes. The at least one positively engaging shift element may be, for example, a shift claw.

An analysis of different planetary-type automatic gearbox topologies has shown that, in the case of some gearboxes, one and the same transmission ratio (hereinafter referred to as "identical transmission ratio") between the gearbox input and the gearbox output can be realized by way of different "shift states" of the individual shift elements of a gearbox. In this case, a "gearbox shift state" is defined by the present shift states of the individual shift elements of the gearbox. Each of the individual gearbox shift states has a very particular transmission ratio between a gearbox input and a gearbox output.

In a gearbox according to the invention, there are now at least two gearbox shift states which have an "identical transmission ratio". It is, for example, conceivable for the so-called "direct gear", which is distinguished by the fact that the rotational speed of the gearbox output is equal to the rotational speed of the gearbox input, to be realized by way of two or more different gearbox shift states.

The expression "identical transmission ratio" should be interpreted not in an absolutely literal sense but as encompassing not only mathematically exactly identical transmission ratios but also transmission ratios which are "approximately" equal, in particular transmission ratios which differ from one another by less than 10%, preferably by less than 5% and particularly preferably by less than 2%.

It may now be provided that, to shift into a first of the at least two gearbox shift states with an "identical transmission ratio", only non-positively engaging shift elements have to be closed. In this context, however, the plural term "non-positively engaging shift elements" should not be interpreted in the strictly grammatical sense. What this means is that, to shift into a first of the at least two gearbox shift states with "identical transmission ratio", either only one single non-positively engaging shift element or only multiple non-positively engaging shift elements (but no positively engaging shift elements) have to be closed.

However, to shift into a second of the at least two gearbox shift states with identical transmission ratio, at least one positively engaging shift element must be closed.

An aspect of the invention is that, at least in the case of some shift processes in which it is intended to shift from a present gearbox shift state, whose transmission ratio differs from the abovementioned "identical transmission ratio", to the "identical transmission ratio":

a) a shift is performed firstly into the first gearbox shift state and b) subsequently into the second gearbox shift state, wherein it is pointed out that the transition into the abovementioned shift state b) does not imperatively assume a rotational speed differential of zero at the claw. The claw may be engaged even in the presence of a slight, but not excessive, rotational speed differential (engagement rotational speed differential range in which shifting can be performed).

A very great advantage of the invention can be seen in the fact that, despite the use of a positively engaging shift element, shifts can be performed under load (so-called "powershifts").

At least in the case of some shift processes in which a direct shift into the second of the at least two gearbox shift states would not be possible under load (owing to the positively engaging shift element that has to be closed), a shift is thus initially performed into the first of the at least two gearbox shift states.

Subsequently, the shift is performed from the first gearbox shift state, which has the same transmission ratio as the second of the at least two gearbox shift states, into the second gearbox shift state.

If a shift were to be performed directly from a present gearbox shift state, the transmission ratio of which differs from the "identical transmission ratio", into the second gearbox shift state, grating of the positively engaging shift element that has to be closed, and/or a drop in traction power, could occur at least in the case of some shift processes of the gearbox (owing to the fact that a power shift cannot be realized (open shift)).

For this reason, it may be expedient to provide in the shift strategy an "indirect route" via the first of the at least two gearbox shift states with identical transmission ratio.

Even though the at least two gearbox shift states have the same transmission ratio, it is expedient, after the shift into the first of the at least two gearbox shift states, for an onward shift to be performed into the second of the at least two gearbox shift states, because after the engagement of the respective positively engaging shift element, no further power or energy, or only a small amount of further power or energy, is required to keep said shift element closed. A transition to the second of the at least gearbox shift states with identical transmission ratio is expedient, in particular, when the gearbox is subsequently shifted onward into gearbox shift states in which the at least one positively engaging shift element has to be closed, or kept closed, in any case.

In one refinement of the invention, the above-described shift strategy is in the case of a "traction upshift", in the case of which, during traction operation of the vehicle, it is intended to shift from a present gearbox shift state, whose transmission ratio differs from the identical transmission ratio, to the identical transmission ratio, a shift is performed firstly into the first gearbox shift state and, subsequently, into the second gearbox shift state. A traction upshift is to be understood to mean a shift process in which the drive engine and thus also the gearbox of the vehicle are in traction operation (that is to say are driving the vehicle) and a shift is to be performed from a present forward gear into a higher forward gear. A traction upshift is encountered for example if, while the vehicle is accelerating, a shift is performed from the second gear to the third gear or from the third gear to the fourth gear or from the fourth gear to the fifth gear, etc.

If two or more different gearbox shift states exist for the target transmission ratio or the target gear ratio, specifically a gearbox shift state which can be attained proceeding from the present gearbox shift state by closing only non-positively engaging shift elements, and another gearbox shift state which can be attained by closing at least one positively engaging shift element, it is expedient to implement the above-described method according to the invention because, with the method, shifting without an interruption in traction power is possible even in the case of a traction upshift in which at least one positively engaging shift element ultimately has to be closed.

In a refinement of the invention, it may be provided that, in the case of the traction upshift described above, it is always the case that a shift is performed firstly into the first gearbox shift state and, subsequently, into the second gearbox shift state. However, it is not imperative that the method according to the invention is always used in the case of every traction upshift such as is described above.

Even though traction downshifts into the claw do not have to be performed via the "alternative gear", but can also be performed without an interruption in traction power even with any conventional claw, the method according to the invention may also be implemented in the case of traction downshifts. Specifically, it may be provided that, in the case of a traction downshift, in the case of which, during traction operation of the vehicle, it is intended to shift from a present gearbox shift state, whose transmission ratio differs from the "identical transmission ratio", to the identical transmission ratio, a shift is performed firstly into the first gearbox shift state (that is to say by closing only one or more non-positively engaging shift elements) and subsequently into the second gearbox shift state (by closing at least one positively engaging shift element).

It may be provided that, in the case of every traction downshift as described above, it is always the case that a shift is performed firstly into the first gearbox shift state and, subsequently, into the second gearbox shift state. This is, however, not imperatively necessary.

In the case of shifts performed in overrun operation, that is to say in the case of overrun upshifts or overrun downshifts, in the case of which, during overrun operation of the vehicle, it is intended to shift from a present gearbox shift state, the transmission ratio of which differs from the "identical" transmission ratio, to the identical transmission ratio, provision may be made for a shift to be performed directly into the second gearbox shift state.

Other objects, advantages and novel features of the present invention will become apparent from the following detailed description of one or more preferred embodiments when considered in conjunction with the accompanying drawings.

DETAILED DESCRIPTION OF THE DRAWINGS

Figures 1, 2:
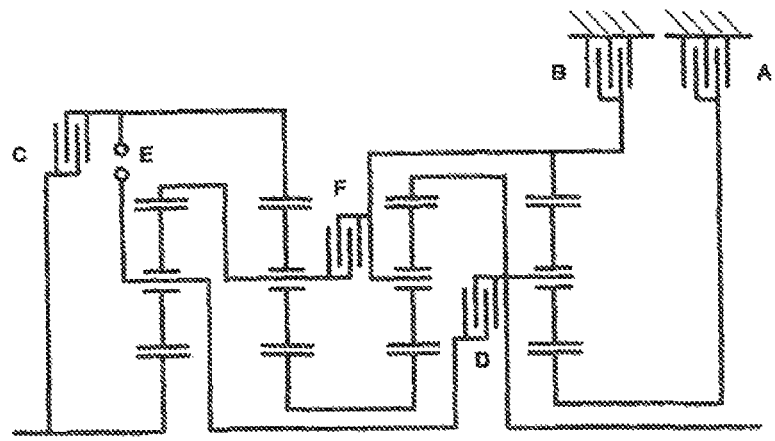
FIG. 1 is a schematic diagram illustrating a gearbox topology of a 9-gear planetary-type automatic gearbox.
FIG. 2 is a shift matrix of the planetary-type automatic gearbox shown in FIG. 1.

FIG. 1 shows a nine-gear planetary-type automatic gearbox 1 having six shift elements A, B, C, D, E and F. Of the six shift elements, the shift elements A, B, C, D, F are in the form of frictionally engaging shift elements, wherein A and B are multiplate brakes and C, D, F are multiplate clutches. The shift element E is in the form of a positively engaging shift element. Shift element E may, for example, be in the form of a shift claw.

The physical design of the gearbox does not need to be discussed in detail.

FIG. 2 shows a shift matrix of the gearbox depicted in FIG. 1. The individual gearbox shift states that the gearbox shown in FIG. 1 can assume are indicated in the left-hand column. The individual gearbox shift states are defined by particular shift states of the individual shift elements A-F. The table cells labelled "X" indicate that the respective shift element is closed (torque can be transmitted via the respective shift element). Empty table cells indicate that the respective shift element is open (torque cannot be transmitted via the respective shift element). For example, if one considers the gearbox shift state 2, it can be seen that the shift elements B, D and E are closed and the shift elements A, C and F are open.

It can also be seen that two "sixth gearbox shift states" exist, which are denoted by the references 6 and 6*. The corresponding transmission ratios are denoted by $i_{-6}$ and $i_{-6*}$ respectively. The transmission ratios $i_{-6}$ and $i_{-6*}$ are identical within the meaning described herein.

If a shift is performed from the gearbox shift state 6 into the gearbox shift state 6* or vice versa, there is no change to the overall transmission ratio of the gearbox. Only the internal shift states of the shift elements differ between the two gearbox shift states. Specifically, in the gearbox shift state 6, the multiplate clutches C and F and the shift claw E are closed, whereas in the gearbox shift state 6*, which has the same transmission ratio as the gearbox shift state 6, the multiplate clutches C, D and F are closed and the shift claw E is open.

For example, if, during traction operation of the vehicle, it is intended to shift from fifth gear into "sixth gear", then according to the invention, a shift is performed firstly into the gearbox shift state 6*, as only non-positively engaging shift elements have to be actuated or closed for this purpose. Specifically, when shifting from the gearbox shift state 5 into the gearbox shift state 6*, it is merely necessary for the multiplate clutch D to be closed and the multiplate clutch B to be opened.

When the desired target transmission ratio $i_{-6*}$, which is identical to the transmission ratio $i_{-6}$, has been attained, a shift can be performed into the shift state 6 without a drop in traction power, wherein it is merely necessary for the multiplate clutch D to be opened and the shift claw E to be closed. In the case of a shift process of this type, no torque or only a very low torque arises at the shift claw, which makes it possible for the shift claw E to be engaged or closed without problems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for performing shifts in a gearbox having multiple non-positively engaging shift elements and at least one positively engaging shift element, wherein
   the gearbox is configured to assume gearbox shift states defined by shift states of the shift elements,
   each of the gearbox shift states has a particular transmission ratio between a gearbox input and a gearbox output, and
   at least two of the gearbox shift states have an identical transmission ratio, wherein
      the shift elements that must be closed in order to shift into a first of the at least two gearbox shift states having the identical transmission ratio are exclusively non-positively engaging shift elements, and
      in order to shift into a second of the at least two gearbox shift states having the identical transmission ratio at least one positively engaging shift element must be closed, wherein the method comprises the acts of:
   in a shift process intended to shift from a present gearbox shift state having a transmission ratio differing from the identical transmission ratio into the identical transmission ratio, first performing a shift into the first of the at least two gearbox shift states having the identical transmission ratio without slipping of the non-positively engaging shift elements associated with the first shift state after the first state non-positively engaging shift elements are engaged, during a period over which rotational speeds of positively engaging components of the at least one positively engaging shift element become sufficiently close to permit engagement of the at least one positively engaging shift element without grating; and
   subsequently performing a shift from the first gearbox shift state into the second of the at least two gearbox shift states having the identical transmission ratio,
   wherein the shift process is a traction upshift performed during traction operation of the vehicle.

2. The method according to claim 1, wherein in the case of the traction upshift, the shift process is always performed by shifting first into the first gearbox shift state and subsequently into the second gearbox shift state.

3. The method according to claim 1, wherein the shift process is a traction downshift during traction operation of the vehicle.

4. The method according to claim 3, wherein in the traction downshift, the shift process is always performed by shifting first into the first gearbox shift state and subsequently into the second gearbox shift state.

5. The method according to claim 1, further comprising the act of:
   in a case of an overrun upshift during overrun operation of the vehicle in which it is intended to shift from a present gearbox shift state whose transmission ratio differs from the identical transmission ratio to the identical transmission ratio, performing the shift from the present gearbox shift state directly into the second of the at least two gearbox shift states having the identical transmission ratio.

6. The method according to claim 1, further comprising the act of:
   in a case of an overrun downshift during overrun operation of the vehicle in which it is intended to shift from a present gearbox shift state whose transmission ratio differs from the identical transmission ratio to the identical transmission ratio, performing the shift from the present gearbox shift state directly into the second of the at least two gearbox shift states having the identical transmission ratio.

7. The method according to claim 1, wherein at least one of the non-positively engaging shift elements is a friction brake or a friction clutch.

8. The method according to claim 7, wherein the friction brake or the friction clutch is a multi-plate brake or a multi-plate clutch, respectively.

9. The method according to claim 7, wherein the at least one positively engaging element is a shift claw.

10. The method according to claim 1, wherein the at least one positively engaging element is a shift claw.

11. The method according to claim 10, wherein the gearbox is a planetary-type automatic gearbox.

12. The method according to claim 1, wherein the gearbox is a planetary-type automatic gearbox.

* * * * *